United States Patent
Albou

(10) Patent No.: US 10,767,830 B2
(45) Date of Patent: Sep. 8, 2020

(54) LIGHTING AND/OR SIGNALLING DEVICE WITH LIQUID-CRYSTAL DISPLAY, IN PARTICULAR FOR A MOTOR VEHICLE

(71) Applicant: VALEO VISION, Bobigny (FR)

(72) Inventor: Pierre Albou, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/329,470

(22) PCT Filed: Aug. 30, 2017

(86) PCT No.: PCT/EP2017/071800
§ 371 (c)(1),
(2) Date: Feb. 28, 2019

(87) PCT Pub. No.: WO2018/041911
PCT Pub. Date: Mar. 8, 2018

(65) Prior Publication Data
US 2019/0264887 A1    Aug. 29, 2019

(30) Foreign Application Priority Data
Aug. 31, 2016    (FR) ...................................... 16 58102

(51) Int. Cl.
*F21S 43/14*    (2018.01)
*F21S 41/64*    (2018.01)
(Continued)

(52) U.S. Cl.
CPC ............. *F21S 43/26* (2018.01); *F21S 41/143* (2018.01); *F21S 41/645* (2018.01); *F21S 43/14* (2018.01);
(Continued)

(58) Field of Classification Search
CPC .......... F21S 41/645; F21S 43/14; F21S 43/20; F21S 43/255; F21S 43/26; F21S 43/40;
(Continued)

(56) References Cited

U.S. PATENT DOCUMENTS 6,424,012 B1 * 7/2002 Kawasaki ......... G02F 1/133345
257/350
2015/0156448 A1    6/2015 Lee
(Continued)

FOREIGN PATENT DOCUMENTS

DE    10 2015 220 543 A1    4/2016
EP        2 503 222 A1    9/2012
(Continued)

OTHER PUBLICATIONS

Machine translation of JP-2003140264-A, retrieved Mar. 17, 2020 (Year: 2020).*
(Continued)

*Primary Examiner* — Isiaka O Akanbi
*Assistant Examiner* — Steven Y Horikoshi
(74) *Attorney, Agent, or Firm* — Oblon, McClelland, Maier & Neustadt, L.L.P.

(57) ABSTRACT

A device for a motor vehicle in order to transmit information to road users for safety is provided. The device includes a light source emitting a primary beam, a scattering element, at least one liquid-crystal display arranged between the light source and the scattering element, the at least one liquid crystal display being controlled in order to selectively transmit at least one portion of the primary beam toward the scattering element to form a secondary beam with at least two different distributions of light, and an image of the at least one liquid-crystal display being formed on the scattering element.

9 Claims, 3 Drawing Sheets

(51) Int. Cl.
*F21S 43/20* (2018.01)
*F21S 43/40* (2018.01)
*F21S 43/16* (2018.01)
*G02F 1/1335* (2006.01)
*G02F 1/13357* (2006.01)
*F21S 41/143* (2018.01)
*F21Y 115/10* (2016.01)
*F21W 103/35* (2018.01)
*F21W 103/45* (2018.01)

(52) U.S. Cl.
CPC ............... *F21S 43/16* (2018.01); *F21S 43/40* (2018.01); *G02F 1/133504* (2013.01); *G02F 1/133553* (2013.01); *G02F 1/133603* (2013.01); *F21W 2103/35* (2018.01); *F21W 2103/45* (2018.01); *F21Y 2115/10* (2016.08); *G02F 2201/56* (2013.01)

(58) Field of Classification Search
CPC .... B60Q 1/26–2607; B60Q 1/28; B60Q 1/30; B60Q 1/302; B60Q 1/32–326; B60Q 1/34; B60Q 1/44; B60Q 1/442; B60Q 1/444; B60Q 1/46; B60Q 1/48–50; B60Q 1/52
See application file for complete search history.

(56) References Cited

U.S. PATENT DOCUMENTS

| | | | | |
|---|---|---|---|---|
| 2016/0003440 | A1* | 1/2016 | Wataya | C09K 11/592 362/510 |
| 2016/0332568 | A1* | 11/2016 | Kim | B60Q 9/00 |

FOREIGN PATENT DOCUMENTS

| | | | | |
|---|---|---|---|---|
| JP | 2003140264 | A | * | 5/2003 |
| JP | 2004-354814 | A | | 12/2004 |
| JP | 2015-99638 | A | | 5/2015 |
| JP | 2015152724 | A | * | 8/2015 |

OTHER PUBLICATIONS

Machine translation of JP-2015152724-A, retrieved Mar. 17, 2020 (Year: 2020).*

International Search Report dated Nov. 24, 2017 in PCT/EP2017/071800 filed Aug. 30, 2017.

* cited by examiner

LIGHTING AND/OR SIGNALLING DEVICE WITH LIQUID-CRYSTAL DISPLAY, IN PARTICULAR FOR A MOTOR VEHICLE

The invention relates to a signalling and/or lighting device, in particular for a motor vehicle. The invention also relates to a lighting module, in particular for a motor vehicle, comprising such a device.

The signalling lights of motor vehicles, depending on their colour, allow warning to be given to other road users, in particular pedestrians or other motorists, of certain dangerous situations. These situations may correspond to the vehicle braking or even to the latter reversing.

There is however a need for a driver to be able to transmit, and thus share, more precise and more explicit information to/with other road users.

To do this, motor-vehicle devices comprising a light source, a scattering element and a controlled element for transmitting light are already known, said controlled element being arranged between the light source and the scattering element. The controlled transmitting element is for example an electromechanical system comprising a matrix array of individually actuatable micro-mirrors, i.e. what is also called a digital micromirror device or DMD. These devices may however prove to be particularly expensive and/or difficult to implement. In addition, these devices sometimes employ lasers, this possibly then creating safety problems with respect to users or during installation of these devices.

There is a need to provide an alternative that is both economical, simple to use and without danger.

One of the objectives of this invention is to provide such an alternative. To this end, the invention provides a signalling and/or lighting device, in particular for a motor vehicle, comprising:
- means for emitting a light beam, called the primary beam, including a light source,
- a scattering element and
- controlled transmitting means interposed between the emitting means and the scattering element, the controlled transmitting means being controlled in order to selectively transmit at least one portion of the primary beam toward the scattering element in order to form a beam, called the secondary beam, with at least two different distributions of the light,
- characterized in that the controlled transmitting means comprise at least one liquid-crystal display arranged at distance from the scattering element, an image of the liquid-crystal display being formed on the scattering element.

According to various embodiments, which will possibly be implemented together or separately:
- at least one dimension of the liquid-crystal display is smaller than the corresponding dimension of the image formed on the scattering element,
- at least one dimension of the liquid-crystal display is smaller than the corresponding dimension of the scattering element,
- the luminous device furthermore comprises a first optic and a second optic,
- the first optic is interposed between the source and the liquid-crystal display in order to form the primary beam,
- the second optic is interposed between the liquid-crystal display and the scattering element and is designed to form the image of the display on the scattering element,
- the liquid-crystal display is substantially planar,
- the liquid-crystal display is curved so as to allow a small angle of incidence to be obtained for each of the rays of the primary beam on the liquid-crystal display,
- the liquid-crystal display is equipped with a fixed mirror configured to reflect toward the scattering element at least one portion of the primary beam,
- the device comprises at least two liquid-crystal displays placed angularly about the source so as to allow a small angle of incidence to be obtained for each of the rays of the primary beam on each liquid-crystal display,
- the device comprises at least two light sources and as many liquid-crystal displays, each of the light sources being designed so as to illuminate one or other of the liquid-crystal displays, respectively,
- the primary beam is divergent, the emitting means including solely the light source,
- the light source is point-like,
- the scattering element comprises luminophores suitable for converting the wavelengths emitted by the light source into different wavelengths so as to obtain a different colour from that of the light source in particular by fluorescence or phosphorescence, The invention also relates to a lighting module in particular for a motor vehicle, comprising a device such as described.

The invention will be better understood, and other aims, details, features and advantages thereof will become more clearly apparent from the following detailed explanatory description of at least one embodiment of the invention, which is given by way of nonlimiting example with reference to the appended schematic drawings.

Figure 1:
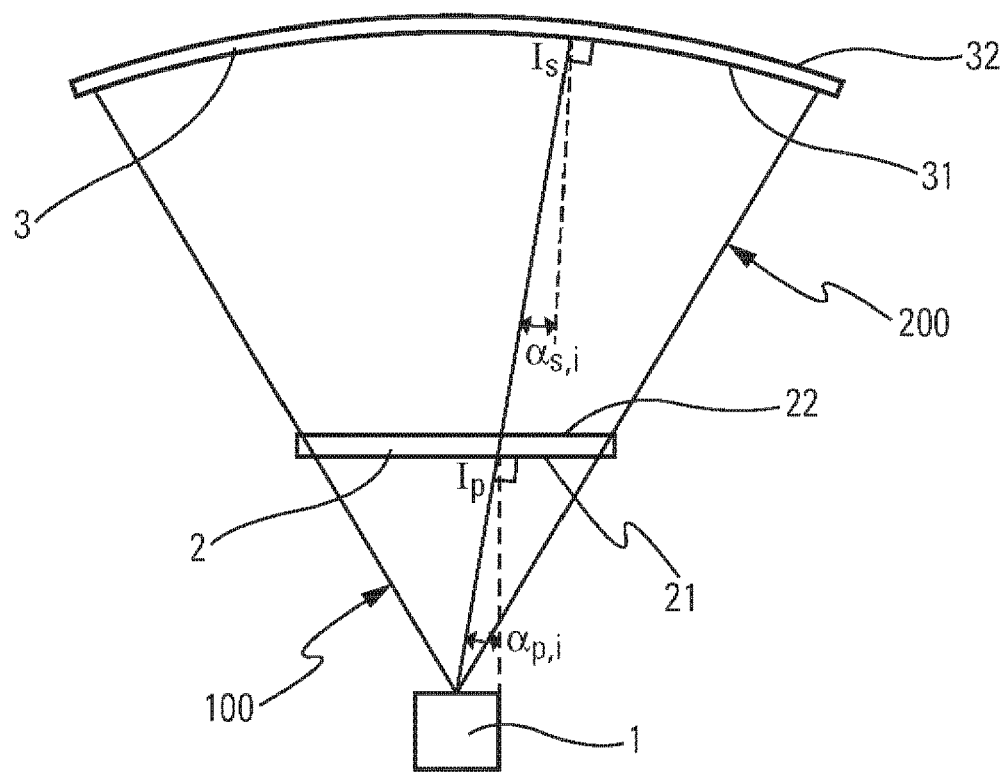
FIG. 1 is a schematic view, in axial cross section, of a device according to the invention according to a first embodiment.

The invention relates to a signalling and/or lighting device, in particular for a motor vehicle.

As illustrated in FIGS. 1 to 6, the signalling and/or lighting device comprises means for emitting a light beam, controlled transmitting means and a scattering element 3.

Below, a light-beam portion that issues or comes from the emitting means and that propagates from the emitting means to the controlled transmitting means will be called a "primary beam" 100. The primary beam 100 is composed of light rays, which are referred to as primary rays.

That portion of the light beam which issues or comes from the emitting means and which propagates from the controlled transmitting means toward the scattering element 3 will be called the "secondary beam" 200. The secondary beam 200 is composed of light rays, which are referred to as secondary rays.

That portion (not shown) of the light beam which issues or comes from the scattering element 3 and which propagates from the scattering element 3 toward the exterior of the signalling and/or lighting device is called the "exit beam".

The signalling and/or lighting device is designed to produce an exit beam that meets the regulatory requirements in force. These regulatory requirements are relative in particular to the intensity of the exit beam, to the angle of visibility of the exit beam and to its colour.

The emitting means are intended to project the primary beam 100 toward the controlled transmitting means. The emitting means comprise a light source 1 designed to emit light, the light here taking the form of a light beam, in the direction of the controlled transmitting means. In other words, the light source 1 is designed to emit the primary beam 100 in the direction of the controlled transmitting means.

The light source 1 is here a point source or a quasi-point source. In other words, the light emitted by the light source 1 appears to come substantially from one and the same point. In particular, the light source emits a beam that has on exiting the light source a small width, the width of the beam exiting from the source being equal to the largest transverse dimension of the beam at the place where it exits the light source. The light emitted by the light source 1 is preferably non-coherent. The light source 1 produces a divergent light beam. In other words, as the primary rays propagate they separate from one another. In particular, the primary beam 100 issued from the light source 2 substantially forms a cone. Here, an angular aperture of the primary beam 100 is defined equal to the half-angle at the apex of the cone. An average direction of propagation of the primary beam 100 is substantially coincident with an average direction of the generatrices of the cone.

In the first embodiment illustrated in FIG. 1, the emitting means consist exclusively of the light source 1.

The light source 1 is for example a light-emitting diode. The light-emitting diode may be controlled by an electronic control unit. The electronic control unit for example allows the intensity of the light beam emitted by the light source 1 to be varied.

The light beam emitted by the light source 1 is designed to propagate from the light source 1 to the scattering element 3 via the transmitting means.

The controlled transmitting means are designed so as to selectively transmit at least one portion of the light beam issued from the light source 1 toward the scattering element 3. To this end, the transmitting means are interposed on the path of the light beam.

The controlled transmitting means are here arranged at distance from the scattering element. They are furthermore arranged at distance from the light source 1.

The controlled transmitting means are designed so as to receive the primary rays that compose the primary beam 100. More precisely, the controlled transmitting means are designed so as to form, from the primary beam 100, the secondary beam 200 that propagates from the controlled transmitting means to the scattering element 3. In particular, the controlled transmitting means are designed so as to allow an image to be formed on the scattering element 3. By an image to be formed on the scattering element 3, what is for example meant is that an image is projected onto the scattering element 3.

The controlled transmitting means comprise at least one liquid-crystal display 2, here a single liquid-crystal display 2. In this embodiment, the controlled transmitting means consist exclusively of the liquid-crystal display 2.

The controlled transmitting means are designed to be able to transmit, toward the scattering element 3, with at least two different distributions, the light beam issued from the light source 1.

The liquid-crystal display 2 or LCD is an écran à cristaux liquides to use the French term. By liquid-crystal display 2 what is meant is a display in particular comprising polarizers, electrodes and liquid crystals, the transparency of the liquid-crystal display 2 being dependent on an electric field applied thereto. Advantageously, the liquid-crystal display 2 comprises polymer-free liquid crystals so as to avoid scatter of the light beam passing therethrough.

The liquid-crystal display 2 is designed so as to allow an image to be formed on the scattering element 3. More particularly, the liquid-crystal display 2 is designed so that an image generated by the liquid-crystal display 2 is formed on the scattering element 3. The image generated by the liquid-crystal display 2 depends on the electric field to which the latter is subjected.

More precisely, the application of an electric field to the liquid-crystal display 2, the liquid-crystal display 2 initially being integrally transmissive, allows absorbent zones to be created allowing an image formed from absorbent zones and from transmissive zones to be generated. It will be noted that thus, in case of failure of an electrical power supply allowing the electric field to be generated, the liquid-crystal display 2 remains transparent.

As a variant, the liquid-crystal display 2 is initially absorbent and the application of an electric field to the liquid-crystal display 2 allows zones that transmit light to be created, allowing an image formed from absorbent zones and from transmissive zones to be generated.

The absorbent and transmissive zones are for example formed from pixels. The image may then be formed on the scattering element 3, the image of the absorbent zones forming shadows on the scattering element 3 whereas the image of the transmissive zones forms portions illuminated on the scattering element 3 by the passage of light through the liquid-crystal display 2.

Advantageously, the liquid-crystal display 2 is controlled by an electronic control unit. The electronic control unit for example allows the user to choose the shape of the image formed on the scattering element 3.

The liquid-crystal display 2 is here planar. It here has an entrance face 21 and an exit face 22, the two faces being opposite each other.

The entrance face 21 of the liquid-crystal display 2 is designed to receive the rays of the primary beam 100 issued from the light source 1. The entrance face 21 of the liquid-crystal display 2 is here arranged so as to face the light source 1. In other words, the first face 21 of the liquid-crystal display is here arranged facing the light source 2.

The exit face 22 of the liquid-crystal display 2 is designed, for its part, so that the secondary beam 200 issues from the exit face of the liquid-crystal display 2. The liquid-crystal display 2 is designed so that the second face 22 of the liquid-crystal display 2 is arranged facing the scattering element 3.

Advantageously, the liquid-crystal display 2 allows the secondary beam 200 to be formed in such a way that the secondary beam 200 is formed directly on the scattering element 3.

The liquid-crystal display 2 is here transmissive when it is not in operation. In other words, the liquid-crystal display 2 is designed so as to let light pass when it is not subjected to an electric field.

As a variant, the liquid-crystal display 2 may be designed in order to not let light pass when it is not subjected to an electric field.

The scattering element 3 is arranged at distance from the liquid-crystal display. However, as was mentioned above, the light beam emitted by the light source is divergent. Thus, at least one dimension of the liquid-crystal display 2 is smaller than the corresponding dimension of the image formed by the liquid-crystal display 2 on the scattering element 3.

Likewise, at least one dimension of the liquid-crystal display 2 is smaller than the corresponding dimension of the scattering element 3. Thus, one dimension of the liquid-crystal display 2, which dimension is measured perpendicular to a general direction of propagation of the light beam, is here two times smaller than the corresponding dimension of the scattering element 3. The liquid-crystal display 2 for example has a width equal to 35 mm, with pixels of 50 μm side length.

The angle of incidence $\alpha_{p,i}$ of each of the primary rays is measured between a direction of incidence of each primary ray on the entrance face 21 and a normal to the entrance face 21 passing through the point of incidence $I_p$. The point of incidence $I_p$ here corresponds to a point of intersection between the primary ray and the liquid-crystal display 2. Advantageously, the angle of incidence $\alpha_{p,i}$ of the primary rays is smaller than a limiting angle of incidence beyond which the primary rays no longer pass through the liquid-crystal display 2 with a sufficient transmission and/or are no longer sufficiently stopped by the absorbent zones of the liquid-crystal display 2. Here, the primary rays each have an angle of incidence $\alpha_{p,i}$ smaller than or equal to 30 degrees.

The scattering element 3 is arranged so as to receive the secondary beam 200 issued from the transmitting means. It is designed so as to form the exit beam from the secondary beam 200 coming from the liquid-crystal display 2. Advantageously, the scattering element 3 is designed so that the exit beam has a larger angular aperture than that of the secondary beam 200. The latter feature in particular facilitates the observation of pictograms and of signalling elements.

The scattering element 3 here takes the form of a screen. The scattering element 3 is designed to allow light to pass. To this end, it is for example made from a transmissive, transparent or translucent material. The scattering element 3 is here neutral in colour thereby allowing an image of the same colour as the beam emitted by the light source 1 to be displayed.

As a variant, the scattering element 3 is coloured so as to colour the image formed by the liquid-crystal display 2, for example in red or in another colour.

As a variant, the scattering element 3 comprises luminophores suitable for converting the wavelengths emitted by the light source 1 into different wavelengths so as to obtain a different colour from that of the light source 1, in particular by fluorescence or phosphorescence.

The scattering element 3 here comprises an entrance surface 31 designed to be arranged facing the liquid-crystal display 2 and an exit surface 32, the two surfaces 31, 32 being opposite each other.

In particular, here, the entrance surface 31 of the scattering element 3 is designed to receive the secondary beam 200 issued from the exit face 22 of the liquid-crystal display 2. More particularly, in the example embodiment described here, the scattering element 3 directly receives the secondary beam 200 formed by the liquid-crystal display 2. In other words, here the secondary beam 200 here propagates directly from the liquid-crystal display 2 to the scattering element 3.

The scattering element 3 is here substantially curved. The scattering element 3 is curved so that the entrance surface 31 is concave and so that the exit surface 32 is convex. The curvature of the scattering element 3 advantageously allows a small average angle of incidence of the secondary rays on the scattering element 3 to be obtained. The curvature of the scattering element 3 allows the angle at which the image may be seen by an external observer such as for example a pedestrian or a motorist to the increased. This furthermore allows the shape of the outer lens of the light to be at least partially followed and thus the aesthetic aspect to be improved and the depth of the system to be minimized.

The average angle of incidence of the secondary rays here corresponds to an average of the angles of incidence $\alpha_{s,i}$ of each secondary ray. The angle of incidence $\alpha_{s,i}$ of a secondary ray corresponds to the angle made between, on the one hand, the direction of propagation of the secondary ray and, on the other hand, a normal to the entrance surface 31, the normal being a straight line perpendicular to the entrance surface 31 of the scattering element 3 passing through a point of intersection, called the point of incidence $I_s$, between the secondary ray and the entrance surface 31.

As a variant (not shown) the scattering element 3 is planar.

Figure 2:
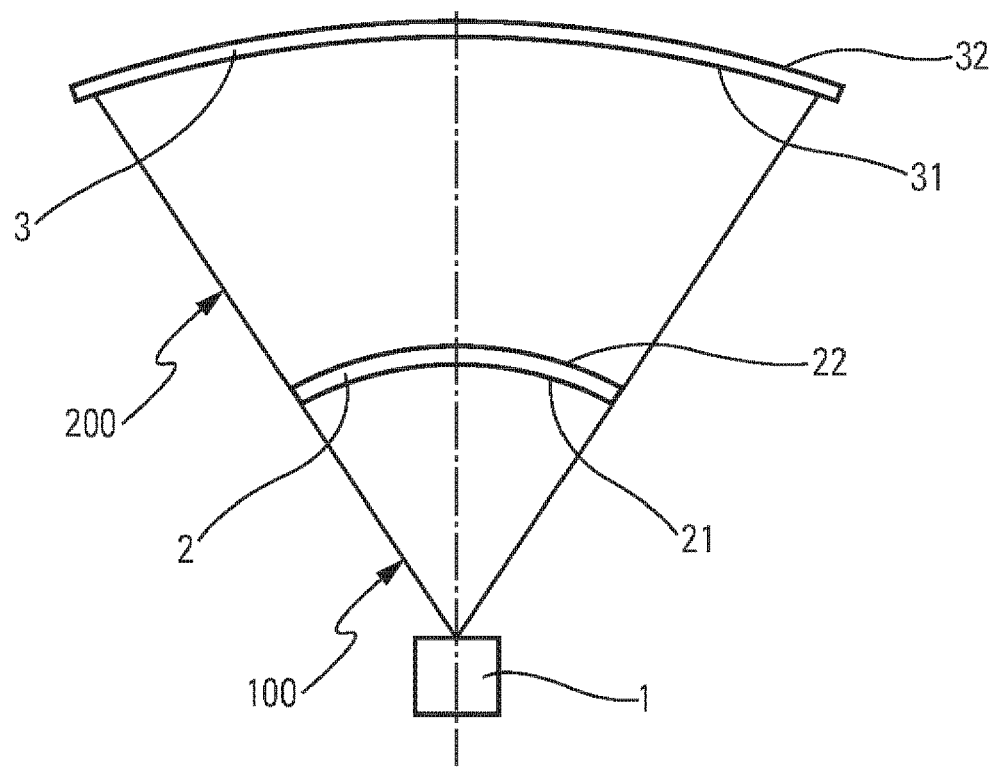
FIG. 2 is a schematic view, in axial cross section, of a device according to a second embodiment according to the invention.

In a second embodiment illustrated in FIG. 2, the liquid-crystal display 2 has a shape that is curved toward the light source 1. In other words, the liquid-crystal display 2 has a curvature. In particular, the liquid-crystal display 2 has a concave face corresponding to the entrance face 21 and a convex face corresponding to the exit face 22. The concave face 21 is oriented toward the light source 1.

For example, the curvature of the liquid-crystal display 2 forms a circular arc and the centre of curvature is for example arranged in proximity to the light source 1.

The average angle of incidence of the primary beam 100 here corresponds to an average of the angles of incidence $\alpha_{p,i}$ of each of the primary rays. Advantageously, the curved shape of the liquid-crystal display 2 allows the average angle of incidence of the primary beam 100 to be decreased, thereby allowing a small angle of incidence $\alpha_{p,i}$ to be obtained for each of the primary rays. It is thus possible to increase the angular aperture of the primary beam 100 with respect to the first embodiment without causing the angle of incidence $\alpha_{p,i}$ of the primary rays to exceed the limiting angle of incidence. According to the invention, each of the primary rays thus has a small angle of incidence $\alpha_{p,i}$, i.e. smaller than or equal to 30 degrees, preferably smaller than or equal to 20 degrees, and more preferably smaller than or equal to 15 degrees. The curvature of the liquid-crystal display 2 is advantageously optimized so that the average angle of incidence of the primary beam has the smallest possible value.

Furthermore, the curved shape of the liquid-crystal display 2 allows a bulk generated by the signalling and/or lighting device to be decreased. In particular, the curved shape of the liquid-crystal display 2 allows a depth of the lighting and/or signalling device to be decreased, the depth being a distance measured between the light source 1 and the scattering element 3.

This configuration therefore allows an image that is wide and/or visible in a plurality of locations on the scattering element 3 to be obtained while decreasing the bulk generated by the signalling and/or lighting device.

Figure 3:
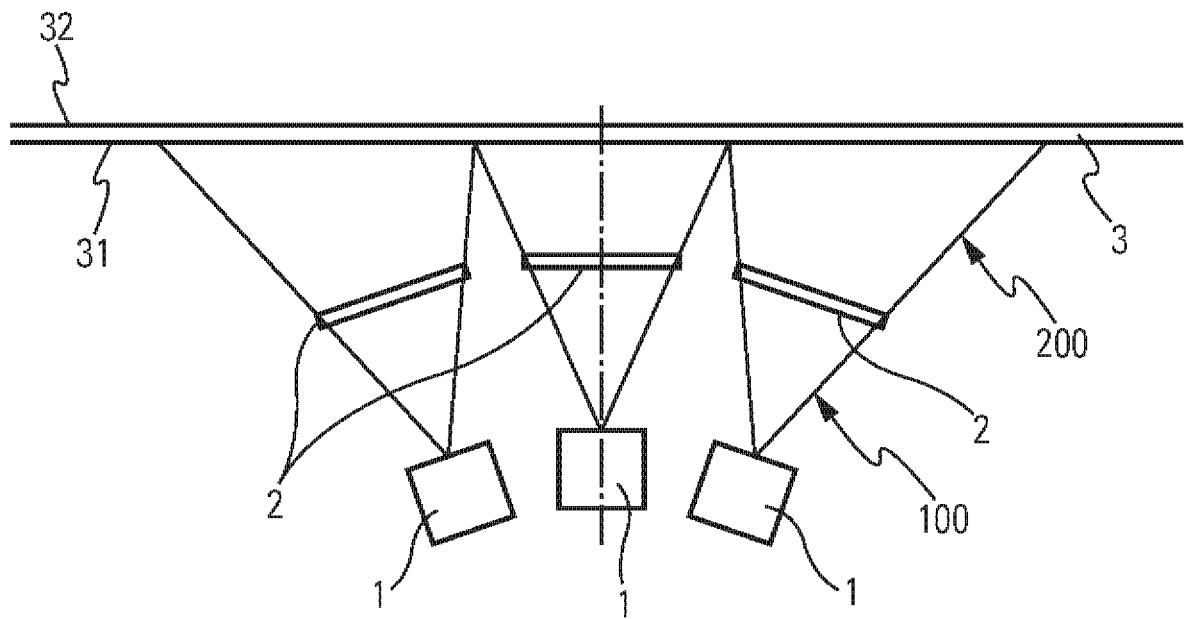
FIG. 3 is a schematic view, in axial cross section, of a device according to a third embodiment according to the invention.

In a third embodiment illustrated in FIG. 3, the signalling and/or lighting device comprises at least two light sources 1 and as many liquid-crystal displays 2. Each of the liquid-crystal displays 2 is associated with one different light source 1.

Here, each light source 1 produces a beam the average propagation direction of which is coincident with a normal to the liquid-crystal display 2 with which the light source 1 is associated. Advantageously, the average direction of propagation of the beams of each light source 1 is secant with a central region of the associated liquid-crystal display 2.

In particular, the signalling and/or lighting device here comprises three light sources 1 and three liquid-crystal displays 2. The light sources 1 are here separate from one another. The liquid-crystal displays 2 are separate and at distance from one another.

The light sources 1 and the liquid-crystal displays 2 are here designed so as to allow one and the same image to be formed on the scattering element 3. In particular, each of the liquid-crystal displays 2 here contributes to forming a different portion of the same image formed on the scattering element 3. The formation of each of the portions of the image and their arrangement with respect to one another on the scattering element 3 may be facilitated via use of a calibration method.

Here, each of the liquid-crystal displays 2 is arranged facing one of the light sources 1. The use of a plurality of light sources 1, each of the light sources 1 being associated with one liquid-crystal display 2, allows an extensive image to be obtained while allowing a small angle of incidence of the rays of the primary beams on each of the liquid-crystal displays 2 to be preserved.

Here, the plurality of liquid-crystal displays 2 allows a small angle of incidence of the rays of the primary beams to be preserved even though the liquid-crystal displays 2 are planar. This configuration allows a wide image to be obtained while decreasing the bulk generated by the signalling and/or lighting device.

The liquid-crystal displays 2 are here arranged substantially tangentially to the same circular arc. Likewise, the light sources 1 are for their part also all arranged here substantially on the same circular arc. The liquid-crystal displays 2 and the light sources 1 may be arranged differently.

As a variant (not shown) of the invention, one or more liquid-crystal displays 2, or even all the liquid-crystal displays 2, may be curved. In this case, the curvature of the one or more liquid-crystal displays 2 allows the angle of incidence of the rays of the primary beams that reach the liquid-crystal displays 2 to be further decreased.

Figure 4:
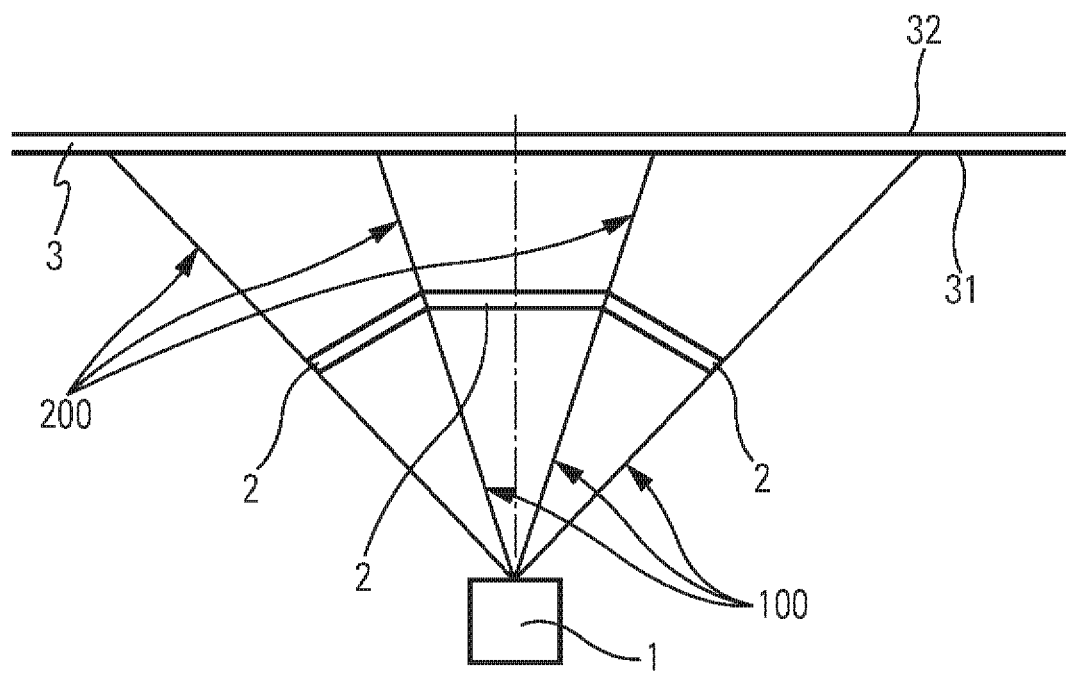
FIG. 4 is a schematic view, in axial cross section, of a device according to a fourth embodiment according to the invention.

In a fourth embodiment illustrated in FIG. 4, the signalling and/or lighting device is similar to that of the third embodiment except that it comprises a single light source 1 and a plurality of liquid-crystal displays 2, here three liquid-crystal displays 2.

The liquid-crystal displays 2 are here arranged similarly to the preceding embodiment except that they are here contiguous and/or make contact with one another.

The liquid-crystal displays 2 are arranged relative to the light source 1 so as to minimize and/or decrease the average angle of incidence of the primary rays. In particular, the liquid-crystal displays 2 are here angularly distributed about the light source 1. The liquid-crystal displays 2 are here planar. As a variant, the liquid-crystal displays 2 will possibly be curved and/or bent toward the light source 1. This configuration allows an image that is large and/or visible in a plurality of locations on the scattering element 3 to be obtained while decreasing the bulk generated by the signalling and/or lighting device.

Figure 5:
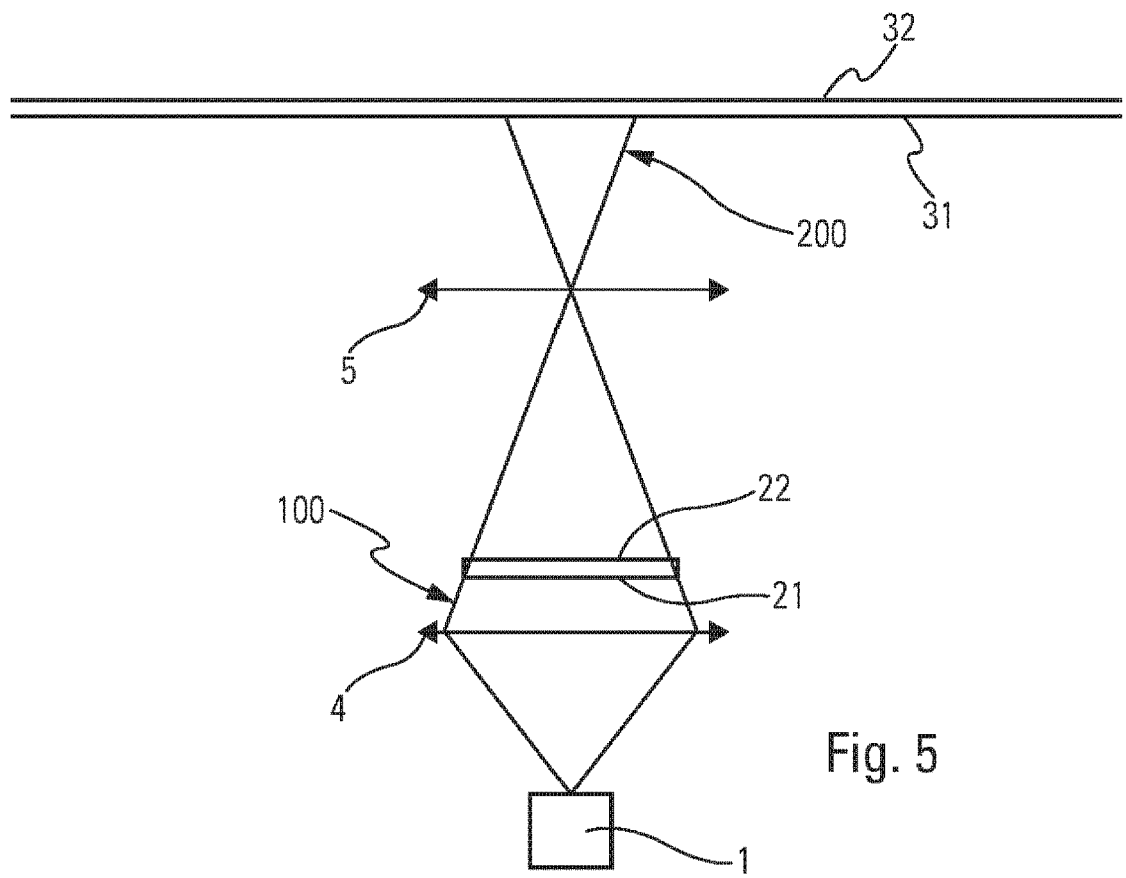
FIG. 5 is a schematic view, in axial cross section, of a device according to a fifth embodiment according to the invention.

In a fifth embodiment illustrated in FIG. 5, the emitting means of the signalling and/or lighting device comprise, in addition to the light source 1, a first optic 4.

The first optic 4 is for example a convergent lens 4. It is designed to be interposed between the light source 1 and the liquid-crystal display 2, on the path of the light beam issued from the light source 1. The first optic 4 is designed so as to form the primary beam 100 that propagates directly toward the liquid-crystal display 2. The convergent lens 4 is designed to allow the light rays issued from the light source 1 to converge, in particular on the second optic 5.

The second optic 5 is for example a divergent lens 5, but more generally a projecting objective. It is interposed between the liquid-crystal display 2 and the scattering element 3, on the path of the secondary beam 200 issued from the liquid-crystal display 2. The divergent lens 5 is here what is called an imaging optic. It is designed to project the image of the liquid-crystal display 2 onto the scattering element 3.

The signalling and/or lighting device is here designed so that the light rays issued from the light source 1 are able to converge on the second optic 5. In other words, the first optic 4 for example allows the light beam issued from the light source 1 to be focused. This focusing makes it possible to achieve a high efficacy in terms of the light flux with the second optic 5. In particular, this focusing here allows a clear image of the liquid-crystal display 2 to be formed on the scattering element 3.

Figure 6:
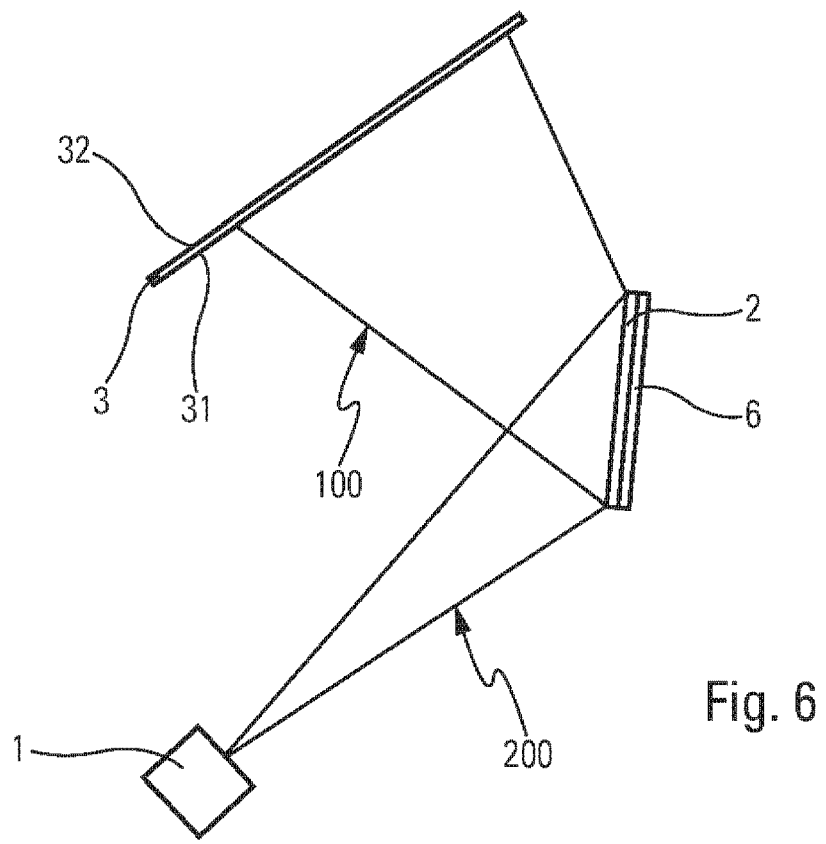
FIG. 6 is a schematic view, in axial cross section, of a device according to a sixth embodiment according to the invention.

In a sixth embodiment, illustrated in FIG. 6, the transmitting means comprise, in addition to a liquid-crystal display 2, a means for reflecting and/or achieving reflection, the liquid-crystal display 2 then being equipped with the means for reflecting and/or achieving reflection. The means for reflecting and/or achieving reflection is for example assembled with the liquid-crystal display 2.

In this embodiment, the emitting means consist exclusively of a single light source 1. It may as a variant be otherwise.

The means for reflecting and/or achieving reflection here comprises a mirror 6. It is for example a fixed mirror 6. The mirror 6 may be made from silicon or a material with similar physical properties. The assembly formed by the mirror 6 and the liquid-crystal display 2 here corresponds to a device of the liquid-crystal-on-silicon or LCoS type.

In particular, the mirror 6 may be arranged on and/or against one face of the liquid-crystal display 2. The signalling and/or lighting device is designed so that the light beam issued from the light source 1 passes a first time through the liquid-crystal display 2, is reflected from the mirror 6, passes once more through the liquid-crystal display 2 and propagates to the scattering element 3.

Advantageously, use of the mirror 6 allows greater flexibility in the arrangement of the various elements of the signalling and/or lighting device with respect to one another. This flexibility in particular allows the bulk generated by the signalling and/or lighting device in the interior of a motor vehicle to be decreased.

In all the preceding embodiments, it is possible to replace, provided, where appropriate, that any required modifications have been made, one or each liquid-crystal display 2 with a LCoS device such as described in the present embodiment.

The invention also relates to a lighting module comprising a device such as described. The lighting module is for example a light.

The invention claimed is:

1. A device for a motor vehicle, the device comprising:
a light source emitting a primary beam;
a scattering element; and
at least one liquid-crystal display arranged between the light source and the scattering element, the at least one liquid crystal display
being controlled in order to selectively transmit at least one portion of the primary beam toward the scattering element to form a secondary beam with at least two different distributions of light, an image of the at least one liquid-crystal display being formed on the scattering element, wherein the at least one liquid-crystal display is curved so as to allow a small angle of incidence to be obtained for each of rays of the primary beam on the at least one liquid-crystal display, the small angle of incidence being smaller than or equal to 30° degrees.

2. The device according to claim 1, wherein at least one dimension of the at least one liquid-crystal display is smaller than the corresponding dimension of the image formed on the scattering element.

3. The device according to claim 1, wherein at least one dimension of the at least one liquid-crystal display is smaller than the corresponding dimension of the scattering element.

4. The device according to claim 1 comprising at least two liquid-crystal displays placed angularly about the source so as to allow the small angle of incidence to be obtained for each of the rays of the primary beam on each liquid-crystal display.

5. The device according to claim 1 comprising at least two light sources and two liquid-crystal displays, each of the at least two light sources being designed so as to illuminate one or other of the two liquid-crystal displays, respectively.

6. The device according to claim 1, wherein the primary beam is divergent.

7. The device according to claim 1, wherein the light source is point-like.

8. The device according to claim 1, wherein the scattering element comprises luminophores suitable for converting wavelengths emitted by the light source into different wavelengths so as to obtain a different colour from that of the light source in particular by fluorescence or phosphorescence.

9. A lighting module for the motor vehicle, the lighting module comprising the device according to claim 1.

* * * * *